US012397400B1

(12) United States Patent
Gunter

(10) Patent No.: US 12,397,400 B1
(45) Date of Patent: Aug. 26, 2025

(54) ACOUSTIC TILE INSTALLATION TOOL

(71) Applicant: Jerald Henry Gunter, Trussville, AL (US)

(72) Inventor: Jerald Henry Gunter, Trussville, AL (US)

( * ) Notice: Subject to any disclaimer, the term of this patent is extended or adjusted under 35 U.S.C. 154(b) by 0 days.

(21) Appl. No.: 19/213,545

(22) Filed: May 20, 2025

Related U.S. Application Data

(63) Continuation-in-part of application No. 18/936,693, filed on Nov. 4, 2024.

(51) Int. Cl.

| | |
|---|---|
| ***B66F 19/00*** | (2006.01) |
| ***B25B 27/14*** | (2006.01) |
| ***E04B 9/34*** | (2006.01) |
| ***E04F 21/18*** | (2006.01) |

(52) U.S. Cl.
CPC .............. *B25B 27/14* (2013.01); *E04B 9/345* (2013.01); *E04F 21/1805* (2013.01)

(58) Field of Classification Search
CPC .............. E04F 21/1805; E04F 21/1861; E04F 21/1833; B25G 3/30; E04B 9/345
USPC .................................................. 294/182, 209
See application file for complete search history.

(56) References Cited

U.S. PATENT DOCUMENTS 2,504,291 A * 4/1950 Alderfer ............... E04G 25/061 248/354.3
3,167,289 A * 1/1965 Nasjleti .................... A47C 3/22 248/565
4,111,408 A * 9/1978 Love ....................... B05B 15/00 248/200.1
4,261,607 A * 4/1981 Pilcher ................ E04F 21/1822 294/182
4,335,913 A * 6/1982 Lick ........................... B25J 1/04 294/182
4,695,028 A * 9/1987 Hunter ................ E04F 21/1805 248/354.1
5,129,774 A * 7/1992 Balseiro .............. E04F 21/1805 248/354.1
5,979,854 A * 11/1999 Lundgren ........... E04F 21/1805 248/354.3
6,471,270 B1 * 10/2002 Mituniewicz ....... E04F 21/1805 294/209
8,157,306 B1 * 4/2012 Guerin ................ E04F 21/1805 294/209

(Continued)

*Primary Examiner* — Paul T Chin
(74) *Attorney, Agent, or Firm* — QuickPatents; Kevin Prince

(57) ABSTRACT

The present invention is a tool for installing and removing acoustic ceiling tiles. It comprises a base with two interlocking central hubs, each having two radially opposing legs. Spikes on the legs temporarily fix the tile. A central handle attachment mechanism allows connection to an elongated handle and locks the hubs rotationally. The hubs interlock at various angles, accommodating different tile sizes. The handle attachment is compatible with multiple thread types. Spikes are removable for customization. One hub features a side wall with gaps, creating a closed base and locking the hubs' rotation when engaged. The hubs may also have interlocking projections and recesses for secure positioning. This design improves efficiency and safety in ceiling tile installation and removal, reducing the need for ladders or scaffolding. The tool's versatility makes it suitable for various tile shapes and installation scenarios.

15 Claims, 5 Drawing Sheets

(56) References Cited

U.S. PATENT DOCUMENTS

| | | | | |
|---|---|---|---|---|
| 8,167,306 | B2 * | 5/2012 | Edwards | H04N 1/123<br>250/559.08 |
| 8,469,427 | B1 * | 6/2013 | Mejia | E04F 21/1805<br>294/209 |

* cited by examiner

ACOUSTIC TILE INSTALLATION TOOL

CROSS REFERENCE TO RELATED APPLICATIONS

This application is a Continuation-in-Part of U.S. application Ser. No. 18/936,693, filed on Nov. 4, 2024, which itself claims the benefit of U.S. Provisional Patent Application 63/731,949, filed on Jun. 27, 2024, both being incorporated herein by reference.

STATEMENT REGARDING FEDERALLY SPONSORED RESEARCH AND DEVELOPMENT

Not Applicable.

FIELD OF THE INVENTION

The present invention relates to tools for installing and removing acoustic ceiling tiles, particularly to a handheld device attachable to an elongated handle for securely gripping, positioning, and releasing ceiling tiles within a suspended grid system.

BACKGROUND

Acoustic ceiling tiles are widely used in commercial and residential buildings to improve sound absorption, provide thermal insulation, and conceal overhead mechanical systems. These tiles are typically installed in a suspended grid system, creating a drop ceiling that is both functional and aesthetically pleasing. The installation and removal of acoustic ceiling tiles can be challenging, particularly when working at heights or in confined spaces.

Traditional methods for installing acoustic ceiling tiles often involve manually lifting and positioning each tile into the ceiling grid. This process can be physically demanding, time-consuming, and potentially hazardous, especially when working on ladders, scaffolding, or lifts, such as so-called "cherry pickers." Accidents are more prone to happen when scaffolding and mechanical lifts are involved.

Therefore, there is a need for a simple, cost-effective tool that can facilitate both the installation and removal of acoustic ceiling tiles. Ideally, such a tool would be lightweight, easy to use, and compatible with a variety of tile types and grid systems. A device that could securely grip tiles, allow for precise positioning, and easily release tiles once placed, would greatly improve the efficiency and safety of ceiling tile work. Furthermore, a tool that could be used with standard extension poles or handles would enhance reach and maneuverability, reducing the need for ladders, scaffolding, or lifts in many situations. The present invention accomplishes these objectives.

SUMMARY OF THE INVENTION

The present invention is a tool for attaching to an elongated handle and for placing an acoustic ceiling tile within a ceiling grid. The tool comprises a base with two interlocking central hubs, each configured to engage at two or more discrete relative angles. Each hub 6 has two legs projecting radially in opposing directions, with the top sides of the legs being co-planar when the hubs are engaged.

Spikes project upwardly from the top side of each leg, designed to temporarily fix the acoustic ceiling tile. A handle attachment mechanism is located at the center of each hub, allowing the tool to be fixed to a handle and locking the hubs together rotationally when engaged.

The handle attachment mechanism includes a threaded aperture compatible with different thread types, accommodating various handle designs. The hubs can be made from either metallic or rigid plastic materials, offering durability and lightweight options.

The spikes are selectively removable, allowing for replacement or customization. The tool can be configured at different discrete angles, including 90/90 degrees for a cross shape, or other combinations like 30/150 or 45/135 degrees for flexibility with different tile sizes.

One hub includes a side wall that creates a substantially closed base when the hubs are brought together. This side wall has gaps to receive the legs of the other hub, locking their relative rotation. The hubs also feature interlocking vertical projections and recesses to secure their rotational position.

This design allows for efficient installation and removal of acoustic ceiling tiles, improving safety and ease of use in ceiling work. The tool's versatility accommodates various tile shapes and sizes, making it adaptable to different installation scenarios.

The present invention addresses the drawbacks of the prior art by providing a simple, cost-effective tool that facilitates both the installation and removal of acoustic ceiling tiles. This lightweight and easy-to-use device is compatible with a variety of tile types and grid systems. The invention securely grips tiles, allows for precise positioning, and easily releases tiles once placed, greatly improving the efficiency and safety of ceiling tile work. Furthermore, the tool is designed to be used with standard extension poles or handles, enhancing reach and maneuverability. This feature significantly reduces the need for ladders, scaffolding, or lifts in many situations, thereby minimizing the risk of accidents associated with working at heights. The present invention thus offers a practical solution to the challenges of ceiling tile installation and removal, making the process safer, faster, and more accessible to both professionals and DIY enthusiasts.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
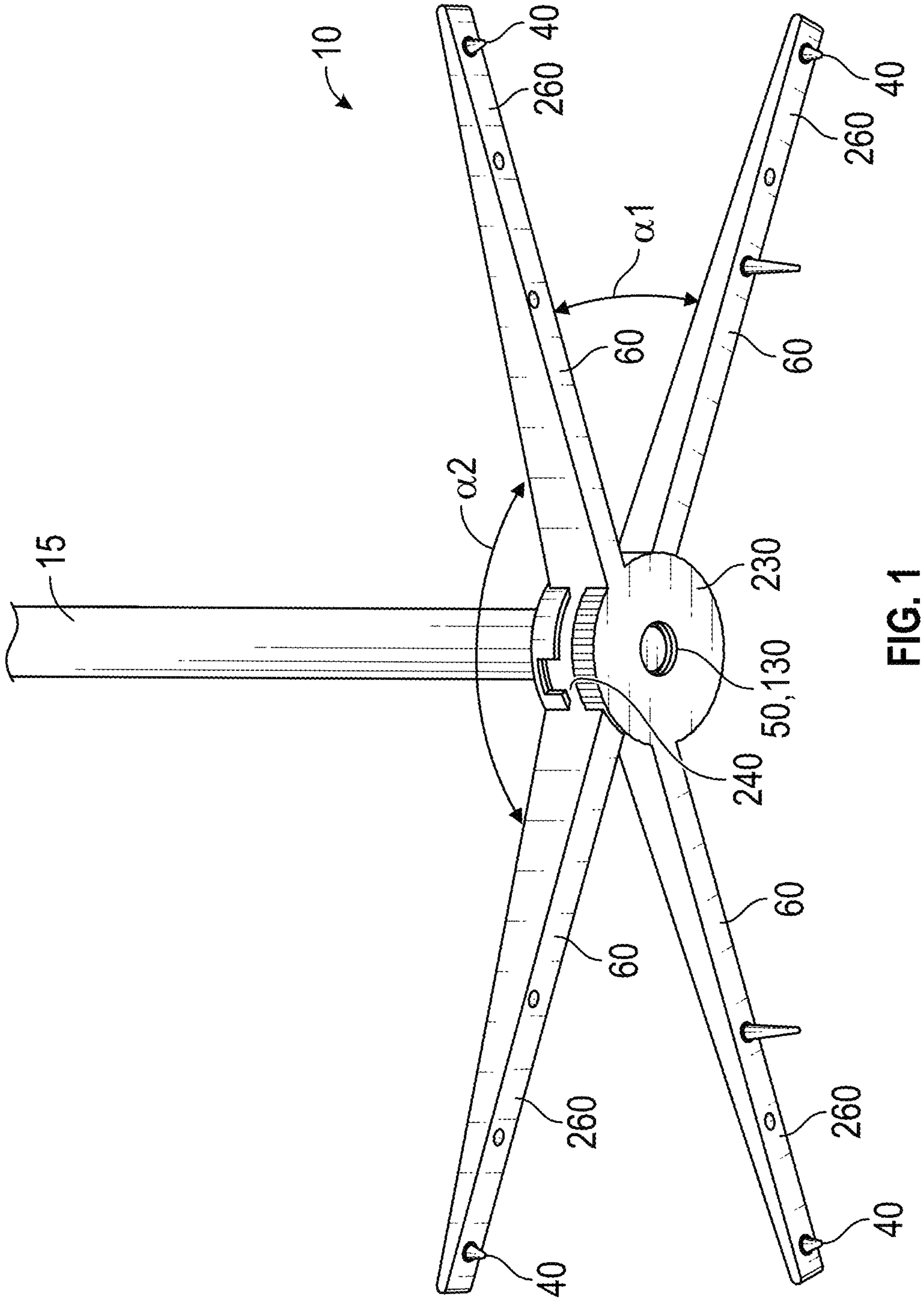
FIG. 1 is a top perspective view of the invention, showing a tool of the present invention that includes a base having a first central hub and an interlocking second central hub.
Figure 2:
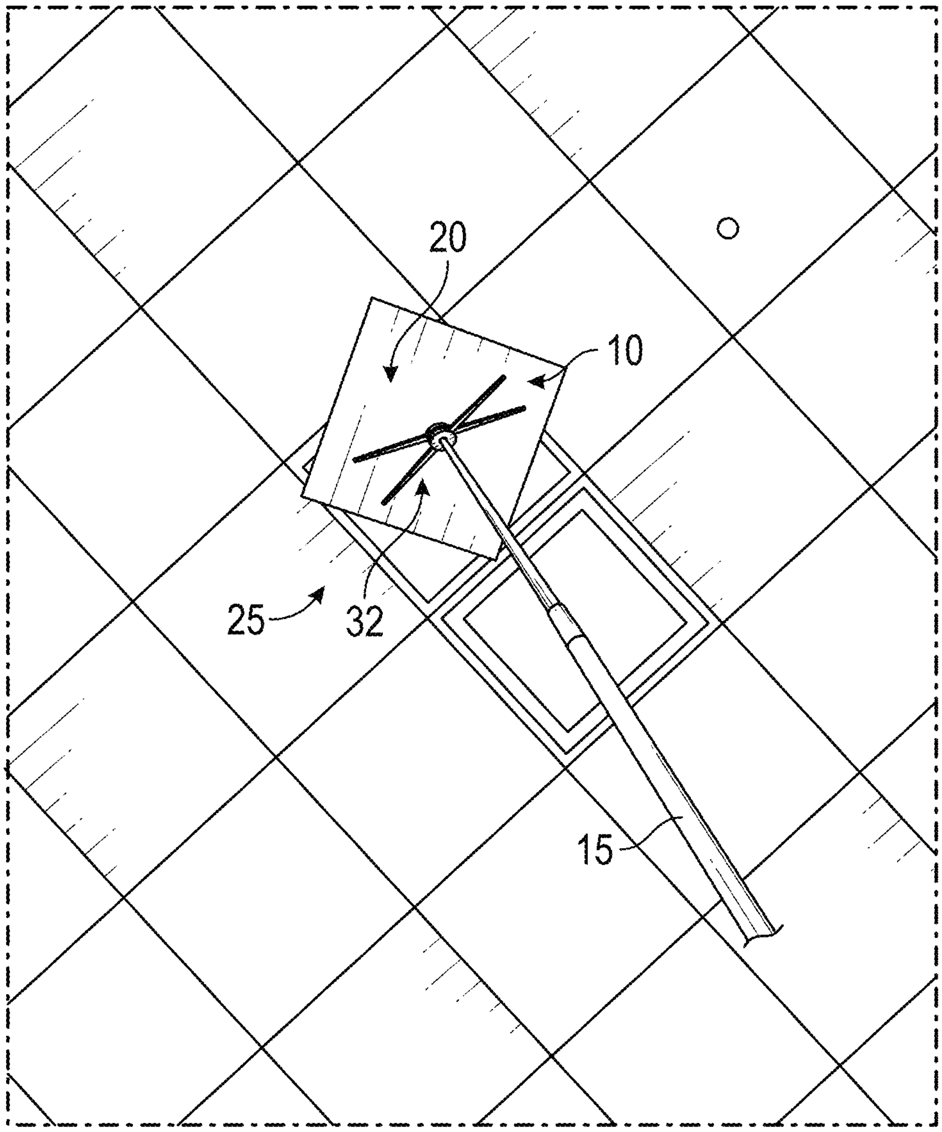
FIG. 2 is a bottom perspective view showing the invention in-use, lifting an acoustic ceiling tile up towards a ceiling grid with a tool of the invention fixed with an extended handle.
Figure 3:
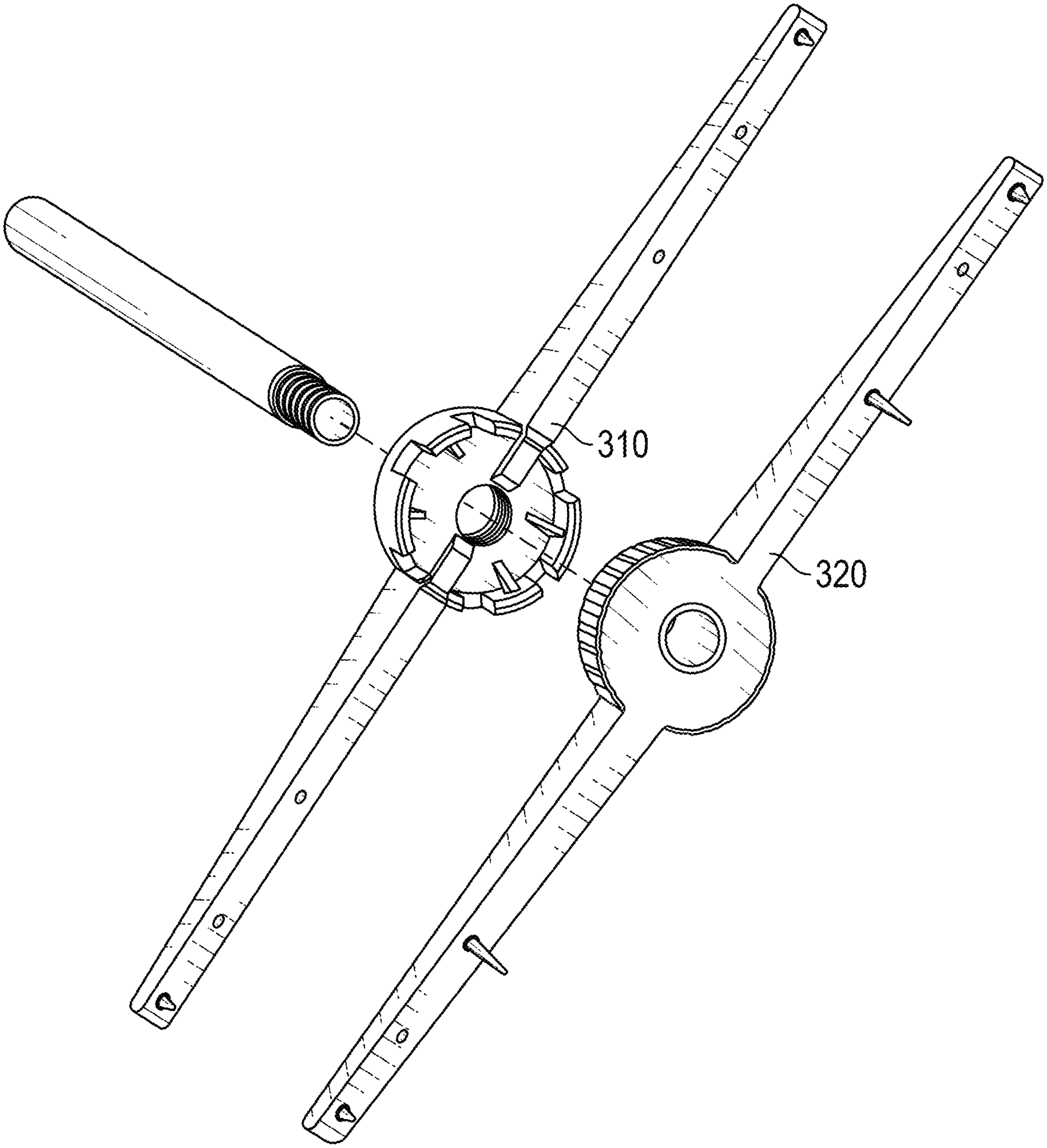
FIG. 3 is an exploded perspective view of the tool.

FIGS. 1 and 2 illustrate a tool 10 for attaching to an elongated handle 15 and for placing an acoustic ceiling tile 20 within a ceiling grid 25. The tool 10 comprises a base 30 having a first central hub 230 and a second central hub 240. Each hub 230, 240 is configured for interlocking at two or more discrete relative angles $\alpha\mathbf{1}$, $\alpha\mathbf{2}$ when mutually engaged. Such a base 30 may be constructed from materials such as aluminum, steel, titanium, alloys thereof, or rigid plastics such as reinforced polymers, high-density polyethylene, polycarbonate, or the like.

Figure 4:
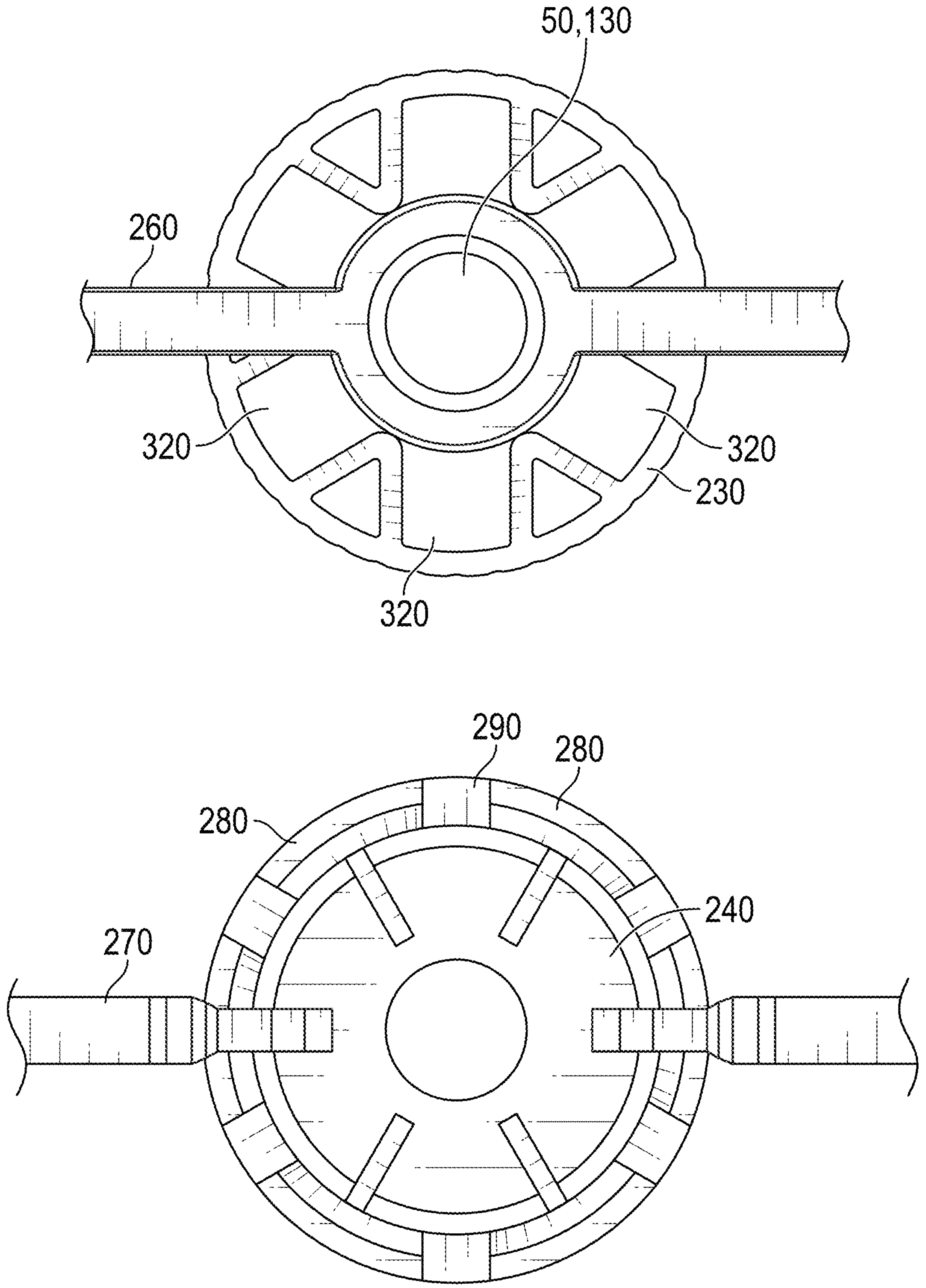
FIG. 4 is a bottom plan view of a first central hub, and a top plan view of a second central hub.

Each hub 230, 240 has two legs 60 projecting radially away therefrom in opposing directions, as shown in FIG. 4. Each leg 60 has a top side 260 and a bottom side 270. The top side 260 of the legs 60 of each central hub 230, 240 are co-planar when the central hubs 230, 240 are mutually engaged. Such legs 60 may be made of materials including aluminum, steel, titanium, reinforced polymer, or the like, and are preferably integrally formed with the hub 230,240 to which they are affixed.

At least one spike 40 projects upwardly from the top side 260 of each leg 60. Such a spike 40 may be made of materials including stainless steel, hardened steel, aluminum, or the like.

A handle attachment mechanism 50 is included at a center of each central hub 230, 240. Such a handle attachment mechanism 50 is configured for fixing with the handle 15 and locking the two central hubs 230, 240 mutually and rotationally together when each central hub 230, 240 is engaged with the handle 15. The handle attachment mechanism 50 may be formed integrally with the hub 230,240.

Figure 5:
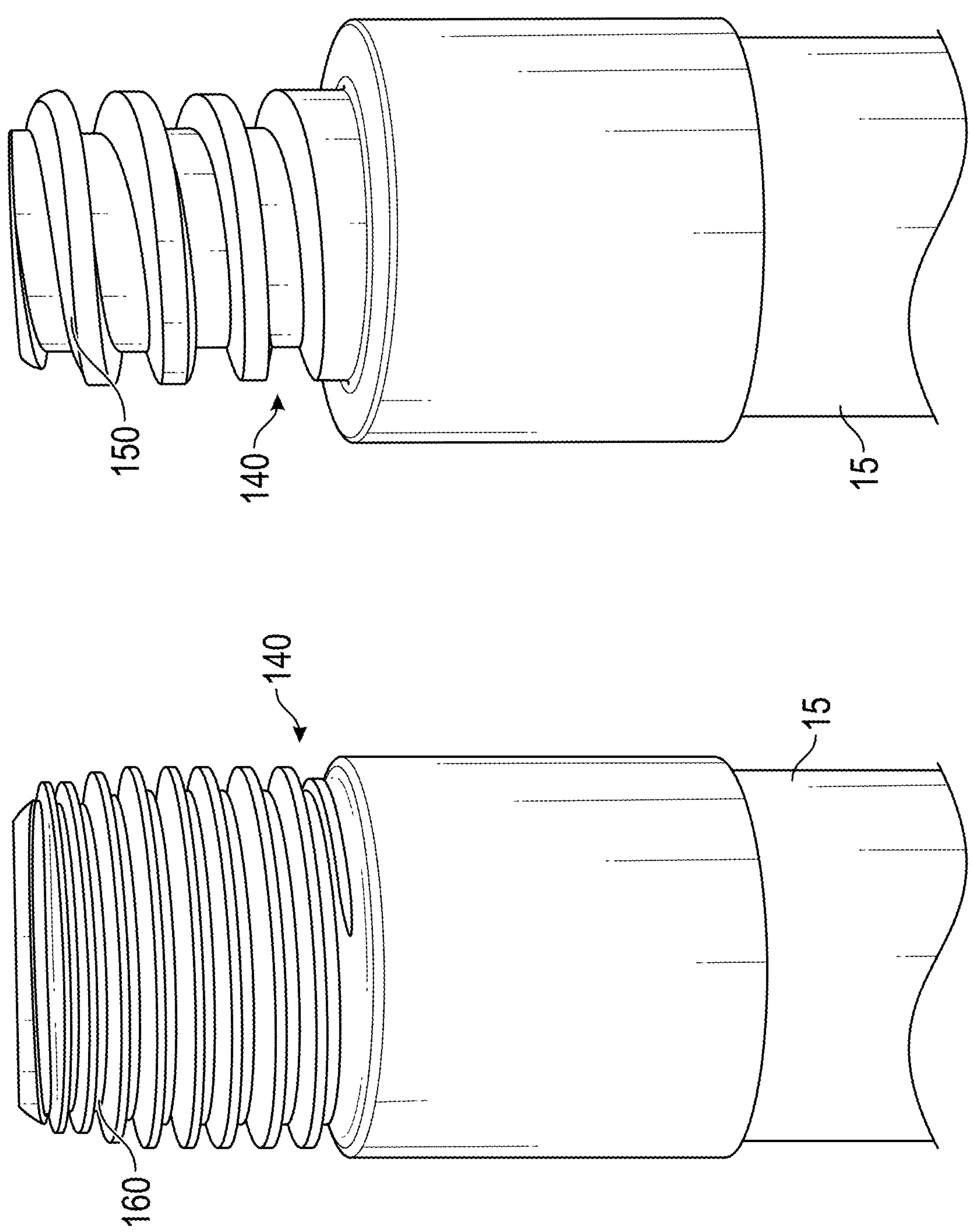
FIG. 5 is a side elevational view showing two types of handle threads, the invention adapted to engage either type in differing embodiments.

The handle attachment mechanism 50 may include a threaded aperture 130 configured for receiving a threaded end 140 of the handle 15, as depicted in FIG. 5. Such a threaded aperture 130 may be configured for receiving an ACME thread 150 of the threaded end 140 of the handle 15, as is commonly used in the United States. Alternatively, the threaded aperture 130 may be configured for receiving European threads 160 of the threaded end 140 of the handle 15.

The first central hub 230 and the second central hub 240 may be made from a metallic material 170 such as aluminum, steel, or the like. Alternatively, the first central hub 230 and the second central hub 240 may be made from a rigid plastic material 180 such as reinforced polymers, high-density polyethylene, polycarbonate, or the like.

Each spike 40 may be selectively removable from the legs 60 of the first central hub 230 and the second central hub 240. This feature allows for replacement or customization of the spikes 40. The removable spikes 40 may be secured using methods such as threaded connections, quick-release mechanisms, press-fit arrangements, or the like.

The two or more discrete relative angles $\alpha\mathbf{1}$, $\alpha\mathbf{2}$ may each be 90 degrees, allowing the tool to form a cross shape. Alternatively, the two or more discrete relative angles $\alpha\mathbf{1}$, $\alpha\mathbf{2}$ may be 30 degrees and 150 degrees, respectively, or 45 degrees and 135 degrees, respectively, providing flexibility for different tile sizes and shapes.

The first central hub 230 may include a side wall 280 such that when the first central hub 230 and the second central hub 240 are brought together they create a substantially closed base 290, as illustrated in FIG. 1. Such a side wall 280 may include gaps 300 for receiving the legs 60 of the second central hub 240. The gaps 300 and legs 60 thus engaged lock the relative rotation of the first central hub 230 and the second central hub 240 when the hubs 230, 240 are mutually engaged.

The first central hub 230 may include at least one vertical projection 310 for interlocking with a cooperative recess 320 in the second central hub 240, to lock the relative rotation of the first central hub 230 and the second central hub 240 when the hubs 230, 240 are mutually engaged. Alternatively, the second central hub 240 may include at least one vertical projection 310 for interlocking with a cooperative recess 320 in the first central hub 230, to lock the relative rotation of the first central hub 230 and the second central hub 240 when the hubs 230, 240 are mutually engaged.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A tool for attaching to an elongated handle and for placing an acoustic ceiling tile within a ceiling grid, comprising:

a base comprising a first central hub and a second central hub, each hub configured for interlocking at two or more discrete relative angles when mutually engaged;

each hub having two legs projecting radially away therefrom in opposing directions, each leg having a top side and a bottom side, the top side of the legs of each central hub co-planar when the central hubs are mutually engaged;

at least one spike projecting upwardly from the top side of each leg; and a handle attachment mechanism included at a center of at least the first central hub, the handle attachment mechanism configured for fixing with the handle through the second central hub and locking the two central hubs mutually and rotationally together when each central hub is engaged with the handle;

whereby the relative angles are first set as appropriate for the shape or size of the acoustic ceiling tile, then the acoustic ceiling tile is temporarily fixed with the at least one spike, and the acoustic ceiling tile is lifted up and placed into the ceiling grid, thereafter lowering the tool disengages the tool from the acoustic ceiling tile.

2. The tool of claim 1 wherein the handle attachment mechanism includes a threaded aperture configured for receiving a threaded end of the handle.

3. The tool of claim 2 wherein the threaded aperture is configured for receiving an ACME thread of the threaded end of the handle.

4. The tool of claim 2 wherein the threaded aperture is configured for receiving European threads of the threaded end of the handle.

5. The tool of claim 1 wherein the first central hub and the second central hub are made from a metallic material.

6. The tool of claim 1 wherein the first central hub and the second central hub are made from a rigid plastic material.

7. The tool of claim 1 wherein each spike is selectively removable from the legs of the first central hub and the second central hub.

8. The tool of claim 1 wherein the two or more discrete relative angles include 90 degrees and 90 degrees.

9. The tool of claim 1 wherein the two or more discrete relative angles include 30 degrees and 150 degrees.

10. The tool of claim 1 wherein the two or more discrete relative angles include 45 degrees and 135 degrees.

11. The tool of claim 1 wherein the first central hub includes a side wall such that when the first central hub and the second central hub are brought together, they create a substantially closed base.

12. The tool of claim 11 wherein the side wall includes gaps for receiving the legs of the second central hub, the gaps and legs thus engaged locking the relative rotation of the first central hub and the second central hub when the hubs are mutually engaged.

13. The tool of claim 1 wherein the first central hub includes at least one vertical projection for interlocking with a cooperative recess in the second central hub, to lock the relative rotation of the first central hub and the second central hub when the hubs are mutually engaged.

14. The tool of claim 1 wherein the second central hub includes at least one vertical projection for interlocking with a cooperative recess in the first central hub, to lock the relative rotation of the first central hub and the second central hub when the hubs are mutually engaged.

15. A tool for attaching to an elongated handle and for placing an acoustic ceiling tile within a ceiling grid, comprising:

a first central hub and a second central hub, each hub having two legs extending radially outward in opposing directions;

at least one spike projecting upwardly from each leg, the at least one spike configured for temporarily fixing with the acoustic ceiling tile;

a handle attachment mechanism projecting downwardly from one of the hubs, the handle attachment mechanism configured for fixing with the handle;

wherein the handle attachment mechanism includes a threaded aperture configured for receiving a threaded end of the handle;

wherein each spike is selectively removable from the legs of the first central hub and the second central hub;

wherein the first central hub and the second central hub are configured to interlock at two or more discrete relative angles, the two or more discrete relative angles being 90 degrees and 90 degrees;

wherein the first central hub includes a side wall such that when the first central hub and the second central hub are brought together, they create a substantially closed base;

wherein the side wall includes gaps for receiving the legs of the second central hub, and these gaps lock the relative rotation of the first central hub and the second central hub; and wherein the first central hub includes at least one vertical projection for interlocking with a cooperative recess in the second central hub, to lock the relative rotation of the first central hub and the second central hub when the hubs are mutually engaged;

whereby the relative angles are first set as appropriate for the shape or size of the acoustic ceiling tile, then the acoustic ceiling tile is temporarily fixed with the at least one spike, and the acoustic ceiling tile is lifted up and placed into the ceiling grid, thereafter lowering the tool disengages the tool from the acoustic ceiling tile.

* * * * *